Mar. 20, 1923. 1,448,782.
P. W. BIDWELL.
APPARATUS FOR TESTING AND RECORDING THE STRENGTH OF MATERIALS.
FILED JULY 20, 1921.
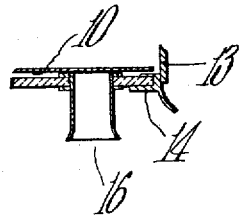
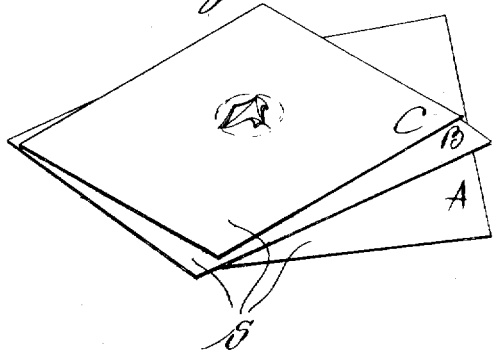
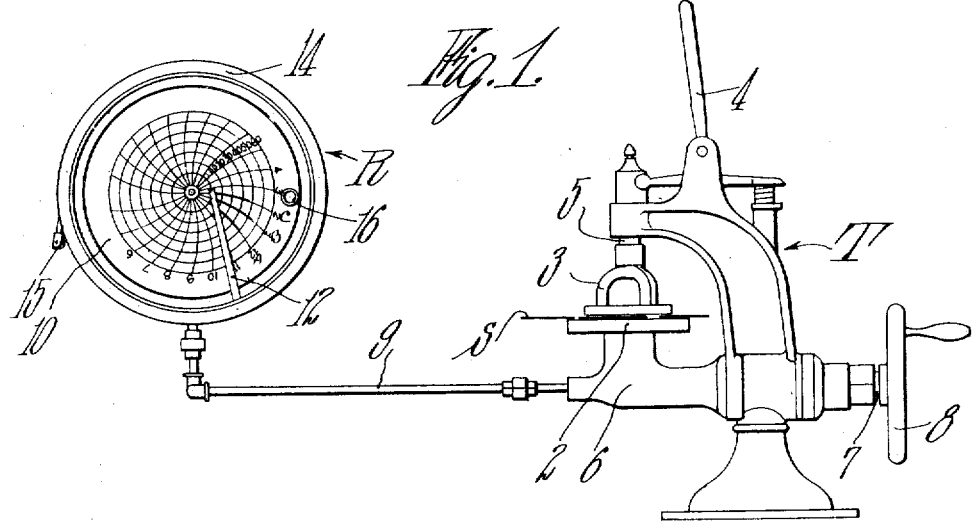
INVENTOR
Paul W. Bidwell
BY
ATTORNEYS Patented Mar. 20, 1923.

1,448,782

UNITED STATES PATENT OFFICE.

PAUL W. BIDWELL, OF EASTHAMPTON, MASSACHUSETTS, ASSIGNOR TO B. F. PERKINS & SON, INC., OF HOLYOKE, MASSACHUSETTS, A CORPORATION OF MASSACHUSETTS.

APPARATUS FOR TESTING AND RECORDING THE STRENGTH OF MATERIALS.

Application filed July 20, 1921. Serial No. 486,043.

*To all whom it may concern:*

Be it known that I, PAUL W. BIDWELL, citizen of the United States, residing at Easthampton, in the county of Hampshire and State of Massachusetts, have invented new and useful Improvements in Apparatus for Testing and Recording the Strength of Materials, of which the following is a specification.

This invention relates to improvements in apparatus for, and methods of testing and recording the strength of fibrous materials, such as paper or the like.

The invention is adapted for general application where it is desired to test and record the strength of fibrous sheets, but one advantageous use for which I have found the invention particularly applicable is in the testing of paper during the manufacture thereof.

A very important requirement in paper manufacturing is that, the paper of a particular run or lot shall possess a substantially uniform strength throughout, and to aid in adjusting the paper machine to produce this uniformity, it is a common practice to check the strength of the paper web at intervals during the run, by consecutively testing the strength of specimens cut therefrom. The present exacting specifications under which paper is made necessitates the desirability of the compulsory testing of the paper web at regular or definite intervals during the run.

Apparatus heretofore used for testing the specimens merely indicate the results of the tests simultaneously with the testing operation, and do not record the results, or the time at which the tests were made, and as the testing remains to be performed at the will of an operator, it is obvious that since there is no record of performance made, that any number of the tests may be omitted, thereby defeating the important purpose of the tests, namely to induce the production of uniform paper over a given time.

The present invention is directed to the provision of apparatus and methods of testing that encourage or rather compel the testing at the desired times or otherwise disclose the failure to test, and is accomplished by automatically and chronologically recording the results of the tests simultaneously with the testing operation, and accordingly;

One object of the invention is the provision of means whereby the pressures required to rupture the specimens are chronologically recorded upon a clock actuated chart by means of which chart, the strength of various specimens tested and the time the tests were taken are readily determinable, and altogether serve as a record of a particular run of paper.

A further object of the invention is the provision of means to facilitate the marking of the chart adjacent the various test results recorded thereon, whereby a specimen similarly marked may be identified with the pressure indicated on the chart.

While the invention is described in its preferred form in connection with the testing of fibrous materials such as paper it is obvious that by changes or modifications in the construction or arrangement of the apparatus it may be equally well adapted for other uses without departing from the scope of the invention.

The invention will be understood from the following description and accompanying drawings in which,—

Fig. 1 is an elevational view of one form of an apparatus adapted for the practice of the invention;

Fig. 2 is a view showing specimens ruptured by the testing thereof and marked with identifying characters; and Fig. 3 is a section at an enlarged scale through the aperture of the front casing of the recording indicator.

Referring to the drawings, the apparatus preferably comprises a testing machine T in which the specimen is tested by the rupturing thereof and a recording pressure device R connected thereto for chronologically and automatically recording the aforesaid rupturing pressure.

While various testing machines may be employed in the practice of the invention, I illustrate for descriptive purposes a machine generally known as a Mullen tester that is disclosed in the patent to Mullen #358,056 of Feb. 22, 1887. This testing machine T consists in a specimen supporting platform 2 and a clamp 3, the latter of which is operable by the lever 4 and stem 5 to confine a specimen *s* securely between the platform 2 and clamp 3. A piston (not shown) is arranged for reciprocating within the cylinder 6 of the tester and is actuated by a screw 7 and hand wheel 8. A fluid is contained within the cylinder 6 and is acted upon by the piston to cause an elastic diaphragm to be distended through an aperture in the platform 2 and against the specimens s. A suitable aperture (not shown) is provided in the clamp 3 and is in register with the aperture of the platform to allow the diaphragm and specimen to pass therethrough when acted upon by the pressure. Thus by securely clamping a specimen between the platform and clamp it may be ruptured, by the fluid pressure against the diaphragm.

The strength of the specimens being tested is determined by the fluid pressure required to cause the rupture. To graphically and chronologically record this pressure, the recording pressure indicating device R is provided and is connected by a suitable communicating conduit or conductor 9 to the cylinder 6 of the tester T.

The recording device R preferably comprises a clock mechanism (not shown) that is adapted to rotate a chart 10 one revolution in any desired length of time, as for instance in twelve or twenty-four hours. The chart is preferably circumferentially divided into divisions representing hours that are designated by characters such as 1, 2, 3, etc., and concentric circles upon the chart, designated by 0, 10, 20, 30, etc. represent various pressures. An indicating or marking pointer 12 is pivoted within the instrument that is adapted to be actuated by the pressure communicated to the device through the conduit 9, and is preferably arranged to move transversely of the chart, from the inner circle designated as 0 outwardly to various positions, depending upon the actuating pressure.

As is usual in devices of this character the clock mechanism, chart, etc. are contained within a suitable dust proof closure comprising a casing 13 having hinged thereto a front wall or door 14. To prevent the opening of the door or the unauthorized tampering with the chart 10 a padlock 15 or other locking device is provided to retain the said door in its closed locked position.

To identify the chart with the test specimen it is desired to mark suitable identifying characters upon the chart and the specimen tested. To permit of this I provide an aperture 16 in the front wall or door 14 of the closure, that is preferably located adjacent the periphery of the chart in line with the path of movement of the pointer or marker 12, which permits the insertion of a marking implement to mark the chart in the proximity of the various pressure indications made by the pointer 12.

The operation of my improved apparatus will now be described with reference to its use in connection with the desired manufacture of paper, and for the purposes of illustration it is assumed that it is required to test the paper at such definite times as on the even hours. For this purpose a chart such as 10 is placed within the recording instrument to receive chronological records to show the results of the tests in the proper timed relation.

The operator, at the required times, as at 12, 1 and 2 o'clock, cuts from the paper web in the paper machine a specimen for testing. This specimen is placed between the clamp and platform of the tester T and is securely clamped therein by means of the clamping lever 4. Pressure is applied to the specimen by means of the hand wheel, piston, fluid, etc., sufficient to rupture it within the area confined by the clamp and platform. The pressure required to rupture the specimen and representing the strength of the paper is communicated by means of the conduit 9 to the recording instrument R. The instrument is actuated by the rupturing pressure to move across the face of the chart from the circle designated as zero to other pressure indications depending upon the actuating pressure. It will be seen that the rupturing pressure is recorded or marked upon the chart on or near the lines thereof that correspond to the time at which the test was taken. Should any of the tests be omitted by the operator the corresponding marks would not appear upon the chart at the particular hour or other time at which the test should have been taken. After each test is taken and for the purpose of comparing the test specimens with the chart, identifying characters are marked upon the specimens and upon the chart through the aperture 16 as A, B, C. By means of the apparatus it is readily obvious that if the operator makes the tests at the desired times that the results will be chronologically recorded upon the chart, and by marking the chart and specimens with identifying characters, a complete record of performance is obtained. From this record it is possible to determine whether specimens were tested at the desired times and at what pressure they ruptured. This will furnish a complete check upon the operator. The apparatus causes the operator to be on the alert in manipulating his paper-making machine for producing the desired uniformity in the strength of the paper over a given run of the machine.

While I have shown and described such apparatus as I have found adapted for testing and recording the strength of paper in the manner described it is obvious that other equivalent apparatus may be used for accomplishing the purpose. The apparatus may be used for testing other materials in a similar manner.

I desire to claim the invention as broadly as the law permits as well as to claim specific embodiments of it.

I claim:

1. A paper testing apparatus having in combination, a pressure paper tester, a time controlled locked device for recording pressure, means to connect said device to the tester whereby it is operated by the pressure in the tester, the said recording device including an aperture in a wall thereof to permit the marking of a given record from the outside.

2. A paper testing apparatus having in combination, a pressure paper tester, a time controlled locked device for recording pressure including a clock actuated chart, carrying radial time divisions, means to connect said device to the tester whereby it is operated by the pressure in the tester, the said recording device including an aperture in a wall thereof to permit the marking of the chart from the outside to identify a given record.

3. The combination in apparatus for testing and recording the strength of paper, of a tester for applying a rupturing pressure to the paper, a recording device in communication with the tester including a clock actuated chart and a movable marker operable by the pressure to graphically record the said pressure upon the chart simultaneously with the application of the rupturing pressure by the tester to the specimen.

4. The combination in apparatus for testing and recording the strength of paper, of a tester for applying a rupturing pressure to the paper, a recording device in communication therewith including a marker and a clock actuated chart carrying radial time indication and concentric pressure indications, the said marker being operable by the rupturing pressure to mark the said chart adjacent the time indication according to the pressure applied thereto at the time the said rupturing pressure is applied to the paper, whereby a record chart is produced that shows the strength of the paper and time tested.

5. The combination in apparatus for testing and recording the strength of paper, of a tester for applying a rupturing pressure to the paper, a recording device in communication therewith comprising a locked closure containing a clock actuated chart and a movable marker adapted to mark the chart according to the rupturing pressure communicated thereto at the time the test is made, the front wall of said locked closure including an aperture through which the said chart may be marked from the outside so as to identify the marking made by the marker with the specimen tested.

In testimony whereof I have affixed my signature.

PAUL W. BIDWELL.